(12) United States Patent
Ottaviani et al.

(10) Patent No.: US 11,840,950 B2
(45) Date of Patent: Dec. 12, 2023

(54) VEHICLE EXHAUST GAS PURIFICATION DEVICE, CORRESPONDING PRODUCTION METHOD, EXHAUST LINE AND VEHICLE

(71) Applicant: FAURECIA SYSTEMES D'ECHAPPEMENT, Nanterre (FR)

(72) Inventors: Eric Ottaviani, Beaucourt (FR); Thomas Sommier, Belfort (FR); Yannick Fourcaudot, Luze (FR); Ting Feng, Vieux-Charmont (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/610,728

(22) PCT Filed: May 5, 2020

(86) PCT No.: PCT/EP2020/063689
§ 371 (c)(1),
(2) Date: Nov. 12, 2021

(87) PCT Pub. No.: WO2020/234180
PCT Pub. Date: Nov. 26, 2020

(65) Prior Publication Data
US 2022/0220876 A1    Jul. 14, 2022

(30) Foreign Application Priority Data
May 17, 2019    (FR) ..................... 19 05202

(51) Int. Cl.
*B01D 53/94*    (2006.01)
*F01N 13/18*    (2010.01)
*F01N 3/20*    (2006.01)

(52) U.S. Cl.
CPC ........... *F01N 3/2013* (2013.01); *B01D 53/94* (2013.01); *F01N 13/1805* (2013.01); *F01N 13/1838* (2013.01)

(58) Field of Classification Search
CPC .............. F01N 3/2013; F01N 13/1805; F01N 13/1838; F01N 2240/16; F01N 2330/22; F01N 3/0275; B01D 53/94; H05B 3/03
(Continued)

(56) References Cited

U.S. PATENT DOCUMENTS 4,723,973 A    2/1988    Oyobe et al.
5,526,462 A *  6/1996    Kondo ................. F01N 3/2814
                                                            219/536

(Continued)

FOREIGN PATENT DOCUMENTS

EP    1967712 A2    9/2008
JP    409317440 A    9/1997
WO    2019197578 A1   10/2019

OTHER PUBLICATIONS

International Search Report for PCT/EP2020/063689 dated Jun. 16, 2020.

*Primary Examiner* — Lessanework Seifu
(74) *Attorney, Agent, or Firm* — Carlson, Gaskey & Olds, P.C.

(57) ABSTRACT

A purification device includes a tubular shell having an inner surface and an electric heating member housed in the tubular shell. The heating member comprises a heating element made of an electrically conductive material which is permeable to exhaust gases. The device also includes an attachment of the heating element directly on the inner surface.

18 Claims, 12 Drawing Sheets

(58) Field of Classification Search
USPC .......................................................... 422/174
See application file for complete search history.

(56) References Cited

U.S. PATENT DOCUMENTS

| | | | |
|---|---|---|---|
| 5,749,223 A | 5/1998 | Kreucher et al. | |
| 2002/0092298 A1* | 7/2002 | Bruck | F01N 3/027 60/300 |
| 2010/0319331 A1 | 12/2010 | Wagner et al. | |
| 2018/0291787 A1 | 10/2018 | Bartolo | |

\* cited by examiner

VEHICLE EXHAUST GAS PURIFICATION DEVICE, CORRESPONDING PRODUCTION METHOD, EXHAUST LINE AND VEHICLE

CROSS-REFERENCE TO RELATED APPLICATIONS

This application is the US national phase of PCT/EP2020/063689, which was filed on May 15, 2020, which claims priority to FR 19 05202, filed May 17, 2019.

FIELD OF THE DISCLOSURE

The present disclosure relates to vehicle exhaust gas purification devices equipped with heating members.

BACKGROUND

A heating member can be made using metal sheets, stacked parallel to each other and rolled, as proposed by DE102007010758.

Such a heating member channels the exhaust gas in a laminar flow. This does not promote heat transfer from the heating member to the exhaust gas.

Furthermore, the heating member is not very rigid and must be attached to the purifier at multiple points. These attachment points are typically rods rigidly connected to the heating element and engaged in the channels of the purification member. This makes the use of a ceramic purifier problematic because of its fragility, and requires that it be made of metal instead. Such a purifier has a higher cost compared to a ceramic purifier.

In this context, the disclosure aims to provide a purification device that does not have the above shortcomings.

SUMMARY

To this end, the disclosure according to a first aspect relates to a vehicle exhaust gas purification device, the purification device comprising:
- a tubular shell having an inner surface and having a central axis;
- an electric heating member housed in the tubular shell, the electric heating member comprises a heating element made of an electrically conductive material which is permeable to exhaust gases; a power supply providing electrical power to the electric heating member; and
- an attachment of the heating element is directly onto the inner surface.

The use of a heating element made of an electrically conductive material permeable to the exhaust gas facilitates heat transfer between the electric heating member and the exhaust gas. The power of the electric heating member can be reduced, which results in lower electrical consumption.

The electric heating member is attached directly to the inner surface of the tubular shell. It is not attached to the exhaust gas purification member.

This makes it possible to use a ceramic purifier, as it no longer has to bear the heating member attachments.

Direct attachment means that the attachment transmits at least 60% of the forces experienced by the heating element, typically at least 90% of the forces, directly to the inner surface. Thus, when the power supply comprises one or more conductor rods passing through the tubular shell to contact the heating element, only a small part of the forces experienced by the heating element are taken up by the conductor rods. The seal between the rod and the tubular shell is only moderately stressed. Its life span is increased.

The purification device may furthermore exhibit one or more of the following features, taken in isolation or in any combination that is technically possible:
- the heating element is made of a foam, the heating element having a central portion in which the foam has a first density and at least one reinforced edge area in which the foam has a second density greater than the first, the attachment securing the or each reinforced edge area to the inner surface;
- the attachment comprises at least one support plate extending along a rim of the heating member and rigidly connected to the or a reinforced edge area of the heating member;
- the attachment comprises a plurality of studs rigidly securing the or each support plate to the inner surface;
- the attachment comprises a layer of electrically insulating material interposed between the heating element and the inner surface, the layer of electrically insulating material advantageously comprising a cylindrical portion radially interposed between a rim of the heating element and the inner surface;
- the layer of electrically insulating material comprises at least one annular portion interposed axially between a major face of the heating element and the inner surface;
- the attachment comprises a peripheral frame surrounding the heating element and attached to the tubular shell, with the layer of electrically insulating material directly interposed between the frame and the heating element;
- the peripheral frame is divided into two half-frames arranged axially on either side of the heating element, each half-frame comprising a peripheral edge interposed between the rim of the heating element and the inner surface, the two peripheral edges being axially interlocked;
- the attachment comprises at least one attachment member rigidly attached to the heating member at a distance from an outer edge of the heating element, the or each attachment member having axially protruding ends on either side of the heating element, the peripheral frame comprising arms rigidly attached to the ends of the or each attachment member;
- the tubular shell has welding holes in the peripheral frame and welds rigidly connecting the peripheral frame to the tubular shell through the welding holes;
- the peripheral frame is a part of the tubular shell;
- the layer of electrically insulating material comprises two sub-layers stacked on each other;
- the attachment comprises a support grid extending in a plane substantially perpendicular to the central axis and attachment members for attaching the grid to the inner surface, the grid having a large grid face to which the heating element is rigidly attached by using electrically insulated rods;
- the heating element has a plurality of through slots, the purification device comprising at least one mask arranged opposite a large face of the heating element and having solid areas axially opposite the slots;
- the heating element has first and second areas electrically connected to first and second terminals of the power supply, the heating element having through slots defining a single S-shaped path through the heating element for electrical current between the first and second areas;

the first and second areas are located on an outer edge of the heating element, and are symmetrical to each other with respect to a geometric centre of the heating element;

the slots are all parallel to one another;

the heating element has at least one through slot inclined at 5 to 30° relative to the axis C.

The disclosure according to a second aspect relates to a method of manufacturing a purification device having the above features, the method comprising a step of attaching the peripheral frame to the tubular shell by welding through welding holes provided in the tubular shell on the peripheral frame.

The disclosure according to a third aspect relates to an exhaust line comprising a purification device having the above characteristics.

The disclosure according to a fourth aspect relates to a vehicle comprising an exhaust line having the above features.

BRIEF DESCRIPTION OF THE DRAWINGS

Further features and advantages will be apparent from the detailed description given below, by way of indication and not in any way limiting, with reference to the appended figures, among which.

DETAILED DESCRIPTION

Figure 1:
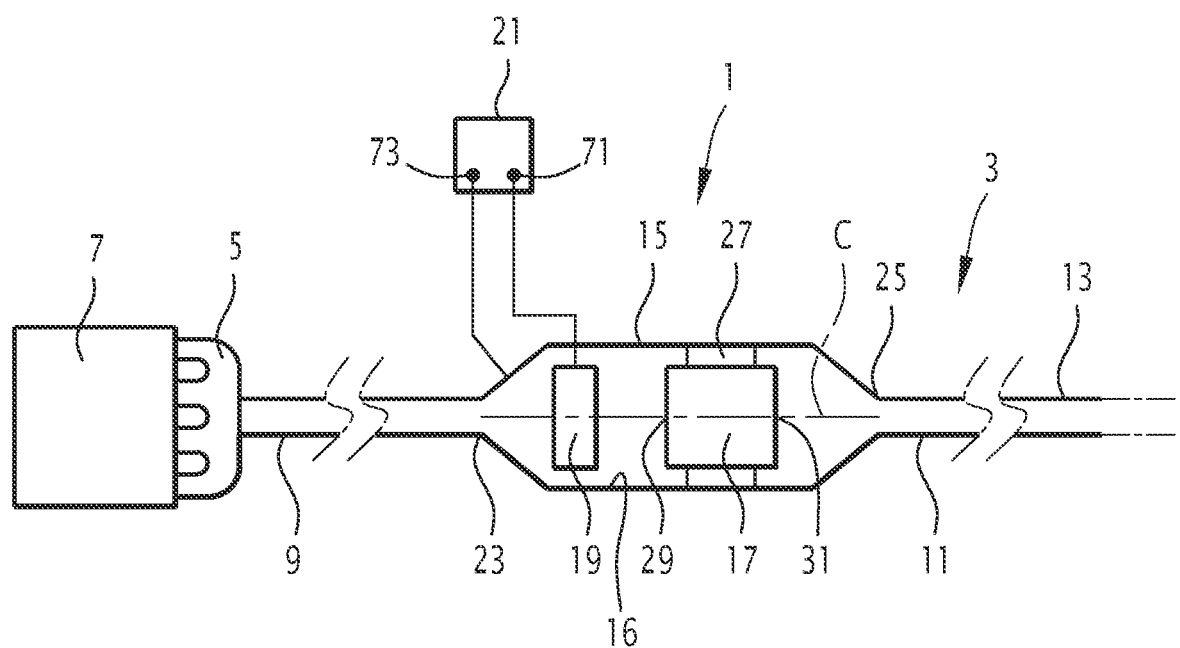
FIG. 1 is a simplified schematic depiction of an exhaust line comprising a purification device according to the disclosure.

The purification device 1 shown schematically in FIG. 1 is intended for purifying the exhaust gas of a vehicle, typically the exhaust gas of a car or truck.

It is inserted into the vehicle's exhaust line 3. This comprises an exhaust manifold 5 which collects the exhaust gases leaving the combustion chambers of the vehicle's internal combustion engine 7.

The purification device 1 is fluidly connected to the manifold 5 by an upstream conduit 9, on which other equipment such as a turbocharger is typically interposed.

Downstream, the purification device 1 is fluidly connected by a downstream conduit 11 to a nozzle 13. Other equipment, such as silencers or other purification equipment, are interposed between the purification device 1 and the nozzle 13. The purified exhaust gas is released into the atmosphere through the nozzle 13.

The purification device 1 comprises a tubular shell 15 having an inner surface 16 of the tubular shell 15 having a central axis C, an electric heating member 19 housed in the tubular shell 15, and a power supply 21 electrically supplying the heating member 19.

The tubular shell 15 has an inlet 23 and an outlet 25 for exhaust gases, connected to the upstream and downstream conduits 9 and 11 respectively.

The tubular shell 15 has any suitable shape.

The purification device 1 further comprises an exhaust gas purification member 17 housed in the tubular shell 15.

The purification member 17 is, for example, an SCR catalyst, a three-way catalyst, an oxidation catalyst or a NOx trap.

As can be seen in FIG. 1, a retaining sheet 27 is interposed between the purification member 17 and the tubular shell 15.

Typically, one or more purification members are placed in the tubular shell 15.

The heating member 19 is advantageously placed opposite and close to the inlet side 29 of the purification member 17. Alternatively, the heating member 19 is placed opposite and close to the outlet face 31 of the purifier 17, i.e. downstream thereof. The inlet face 29 and the outlet face 31 are the faces through which the exhaust gas enters and exits the purification member 17.

Alternatively, the heating member 19 is placed at a distance upstream of the purification member 17.

Figure 2:
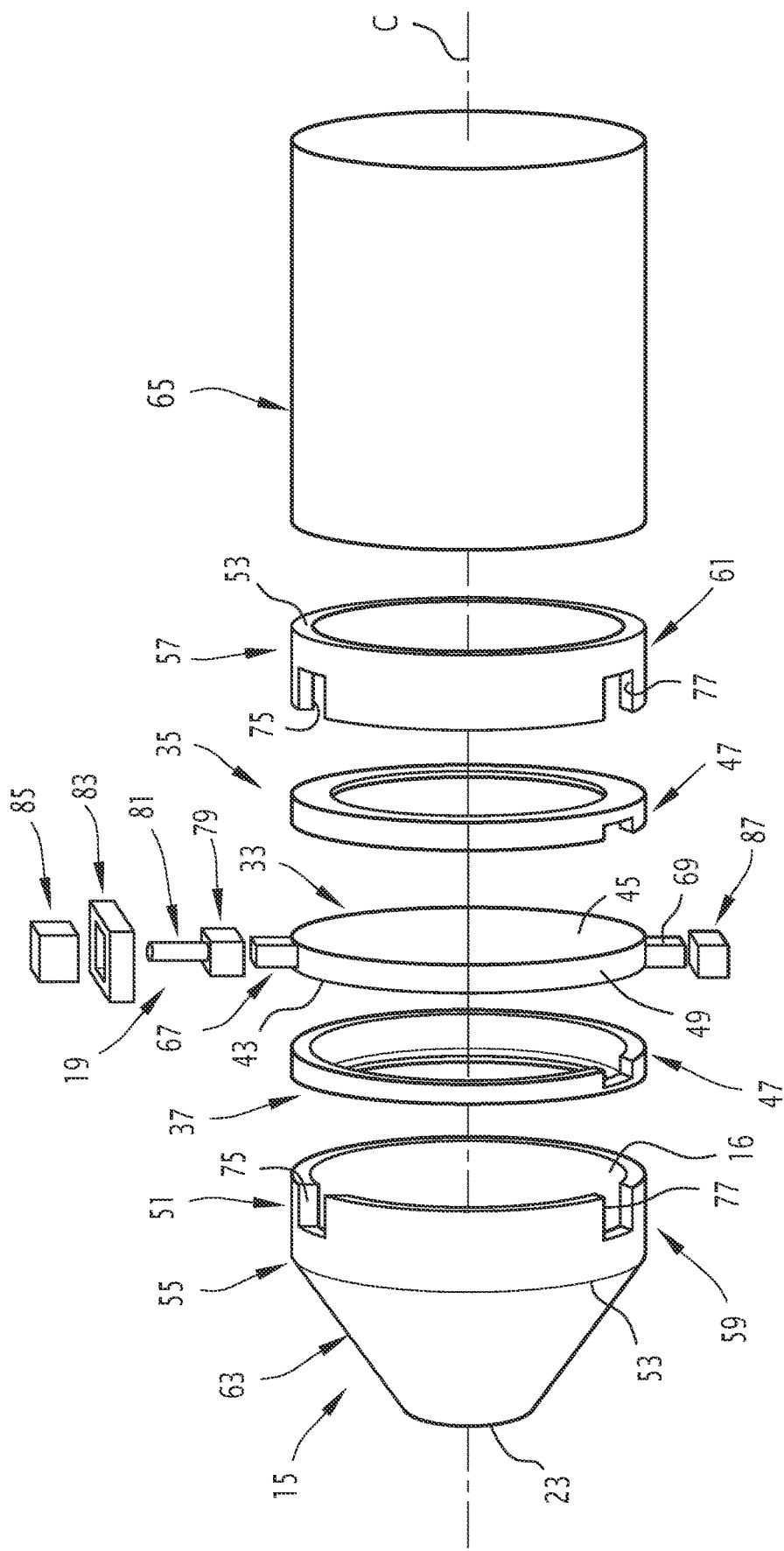
FIG. 2 is an exploded perspective view of a first embodiment of the purification device of FIG. 1.

As shown in FIG. 2, the heating member 19 comprises a heating element 33 made of an electrically conductive material permeable to the exhaust gas.

In one embodiment, the heating element 33 may be substantially flat and thin. Advantageously, the heating element 33 may be in the form of a plate. "Thin" means that the thickness is between 0.3 mm and 30 mm.

According to a first embodiment where the heating element 33 would be a grid, the thickness may range from 0.3 mm to 10 mm, preferably between 0.5 and 2 mm. According to a second embodiment where the heating element is a foam or honeycomb, the thickness may be from 5 mm to 30 mm, preferably between 10 mm and 20 mm.

The heating element 33 typically extends in a plane substantially perpendicular to the central axis C.

Typically, the heating element 33 heats by Joule effect.

It comprises a network of exhaust gas passages, generating a turbulent flow of exhaust gas through the heating element 33.

The material constituting the heating element 33 is typically a metal, such as stainless steel, or a metal alloy, or a ceramic. For example, this material is an iron alloy, such as FeCrAl. Alternatively, the material is a nickel or copper alloy, such as NiCr. In another embodiment, the material is a ceramic made of silicon carbide SiC.

The heating element 33 is typically a foam, with open pores organised in a random or regular manner.

Alternatively, the heating element 33 is a wire mesh or grid, or a honeycomb material.

The pore density is typically between 5 ppi (pores per inch) and 40 ppi. The material typically has a developed surface of between 500 and 5000 m2/m3, preferably between 1000 and 3000 m2/m3, and even more preferably between 1500 and 2500 m2/m3.

Advantageously, the heating element 33 is coated with at least one coating with a catalytic function to contribute to the aftertreatment of the exhaust gas. This coating is intended for the oxidation and/or reduction of polluting compounds in the exhaust gas. It can be, for example, of the same type as those used in TWC (Three-Way Catalyst), DOC (Diesel Oxidation Catalysis), PNA (Passive NOx Absorber), LNT (Lean NOx Trap), SCR (Selective Catalytic Reduction) or for the hydrolysis of a reducing agent used for the reduction of nitrogen oxides.

Alternatively or additionally, this coating is intended to increase the surface roughness of the material, with a view to promoting turbulence and thus heat exchange.

Due to its porosity, the heating element 33 also acts as a particle filter. The heating element 33 is regenerated at each heating, with the trapped soot particles being removed.

Advantageously, the heating element 33 is integral. It is all one piece, made of the same material.

Typically, the heating element 33 is obtained by cutting a single piece of the electrically conductive material from a plate.

Alternatively, the heating element 33 is obtained by casting, extrusion, sintering, additive manufacturing (3D printing), etc.

The heating element 33 has a thickness of between 2 and 50 mm, preferably between 5 and 30 mm, and more preferably between 10 and 20 mm.

In other words, the heating element 33 is in the form of a slice of electrically conductive material, cut directly to the required shape.

According to the disclosure, the purification device 1 comprises an attachment 35 of the heating element 33 directly onto the inner surface 16 of the tubular shell 15.

The attachment 35 transmits directly to the inner surface 16 of the tubular shell 15 at least 60% of the forces to which the heating element is subjected 33, preferably at least 80% of the forces, and more preferably at least 90% of the forces.

In other words, the attachment 35 directly engages the inner surface 16 of the tubular shell 15 to lock the heating element 33 in position.

It transmits to the inner surface 16 of the tubular shell 15 the various forces to which the heating element is subjected: Forces resulting from the acceleration of the vehicle, reaction of the road, forces applied by the exhaust gas, etc.

According to a first embodiment, illustrated in FIG. 2, the attachment 35 comprises a layer 37 of electrically insulating material interposed between the heating element 33 and the inner surface 16 of the tubular shell 15. This layer holds the heating element within the inner surface of the tubular shell.

The material is for example a fibrous refractory material (such as alumina, silica, etc.) or a stratified refractory material (such as mica type, etc.).

The layer 37 comprises a cylindrical portion 39 radially interposed between a rim 49 of the heating element 33 and the inner surface 16 of the tubular shell 15. The cylindrical portion 39 is compressed between the rim 49 and the inner surface 16 of the tubular shell 15. The radial pressure exerted by the cylindrical portion 39 of the electrically insulating layer onto the heating element 33 helps to lock it in position.

It preferably extends around the entire circumference of the heating element 33, and axially along the entire length of the plate.

The layer of electrically insulating material 37 preferably comprises at least one annular portion 41 axially interposed between a large face of the heating element 33 and the inner surface 16 of the tubular shell 15.

i. Typically, the layer of electrically insulating material 37 comprises two annular portions 41, interposed axially between the two large faces 43, 45 of the heating element 33 and the inner surface 16 of the tubular shell 15.

The or each annular portion 41 extends along the peripheral edge of the corresponding large face 43, 45. It covers a small fraction of the radius of the heating element 33, typically less than 20% of the radius, preferably less than 10% of the radius.

In the example shown in FIG. 2, the layer of electrically insulating material 37 comprises two half-layers 47, each having an L-shaped cross-section in a plane containing the central axis C.

Each half-layer 47 is made of one piece and comprises one of the two annular portions 41, and half of the cylindrical portion 39.

Figure 3:
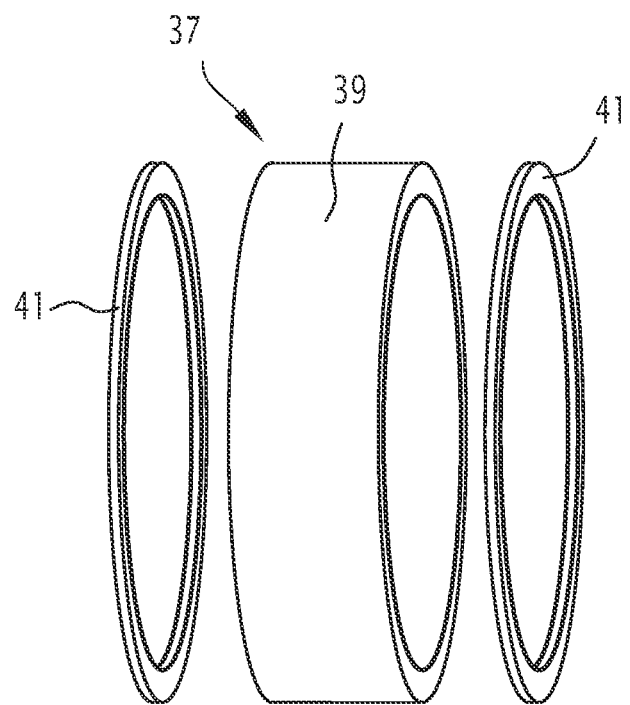
FIGS. 3 and 4 are perspective views of variant embodiments of the electrically insulating material layer of the device of FIG. 1.

In the example shown in FIG. 3, the layer of electrically insulating material 37 comprises three elements independent of each other: The two annular portions 41, and the cylindrical portion 39.

Figure 4:
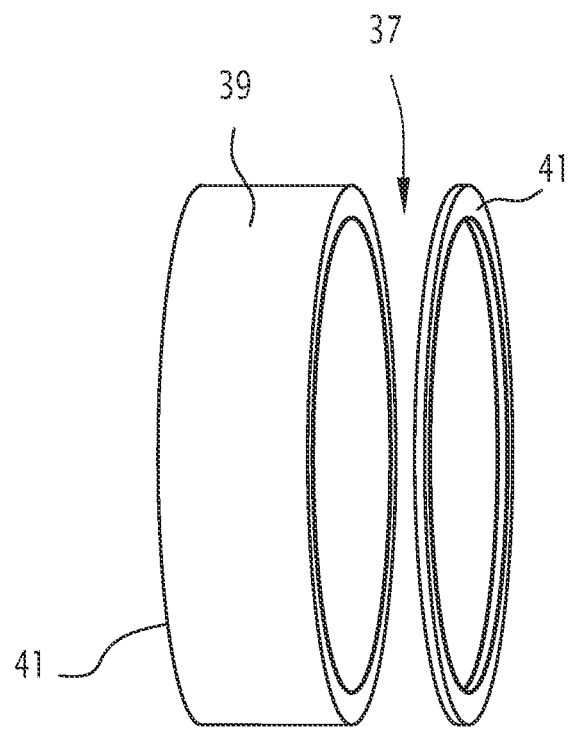

In the example shown in FIG. 4, the layer of electrically insulating material 37 comprises two elements independent of each other: A first one-piece element comprising one of the two annular portions 41 and the cylindrical portion 39, and a second element comprising the other of the two annular portions 41.

The tubular shell 15 comprises a cylindrical portion 51, opposite the rim 49, against which the cylindrical portion 39 of the electrically insulating layer 37 bears.

The tubular shell 15 also comprises, for the or each annular portion 41, a shoulder 53, adjacent to the cylindrical portion 51.

The or each shoulder 53 extends in a plane perpendicular to the central axis C. The or each annular portion 41 bears against the corresponding shoulder 53.

To enable the mounting of the attachment 35, the tubular shell 15 advantageously comprises first and second tubular sections 55, 57.

The first and second tubular sections 55, 57 are independent parts, which are not integral with one another and which are attached to each other.

The first tubular section 55 defines one of the two shoulders 53 and a cylindrical section 59. The second tubular section 57 defines the other shoulder 53 and a further cylindrical section 61. The cylindrical section 59 has an outer cross-section corresponding to the inner cross-section of the other cylindrical section. It is tightly fitted into the other cylindrical section 61.

The first and second tubular sections 55, 57 are rigidly connected to each other by any suitable connection: Peripheral welding, lugs, etc.

The first tubular section 55 has, for example, a cone 63 for connection to the upstream conduit 9, delimiting the inlet 23.

The second tubular section 57 has, for example, a tubular extension 65, in which the purification member 17 is housed.

The cylindrical sections 59 and 61 together define the cylindrical portion 51 against which the cylindrical portion 39 of the electrically insulating layer bears.

The heating element 33 comprises two protrusions 67, 69, electrically connected to the two terminals 71, 73 of the power supply 21.

The protrusions 67, 69 are integral with the rest of the heating element 33.

The protrusions 67, 69 project from the tubular shell 15 through holes 75, 77 in the tubular shell 15.

A cover 79 made of an electrically conductive metal caps the projecting part of the protrusion 67. It is attached to the protrusion 67 by any suitable connection allowing the passage of electric current, for example by brazing or welding. It carries a rod 81 for connection to a conductor electrically connected to the terminal 71 of the power supply 21.

A boss 83 is rigidly attached to the outer surface of the tubular shell 15. It surrounds the cover 79. A layer 85 of electrical insulation is interposed between the cover 79 and the boss 83.

Another cover 87 made of an electrically conductive metal caps the projecting part of the protrusion 69. It is attached to the protrusion 69 by any suitable connection allowing the passage of electric current, for example by brazing or welding. It is also rigidly attached to the outer surface of the tubular shell 15, by any suitable connection allowing the passage of electric current, for example by brazing or welding.

The tubular shell 15 in this case is the second terminal 73 of the power supply 21.

A second embodiment of the disclosure will now be described, with reference to FIGS. 5 and 6. Only the points in which this second embodiment differs from the first will be detailed below. Elements that are identical or perform the same functions in both embodiments will be referred to by the same references.

In the second embodiment, the heating element 33 is a foam.

The heating element 33 has a central portion 89 in which the foam has a first density, and at least one reinforced edge area 91 in which the foam has a second density greater than the first.

The central part 89 has a maximum relative density of 20%, preferably between 5 and 10%, and the reinforced edge area has a minimum relative density of 40%, preferably more than 50%.

Figure 5:
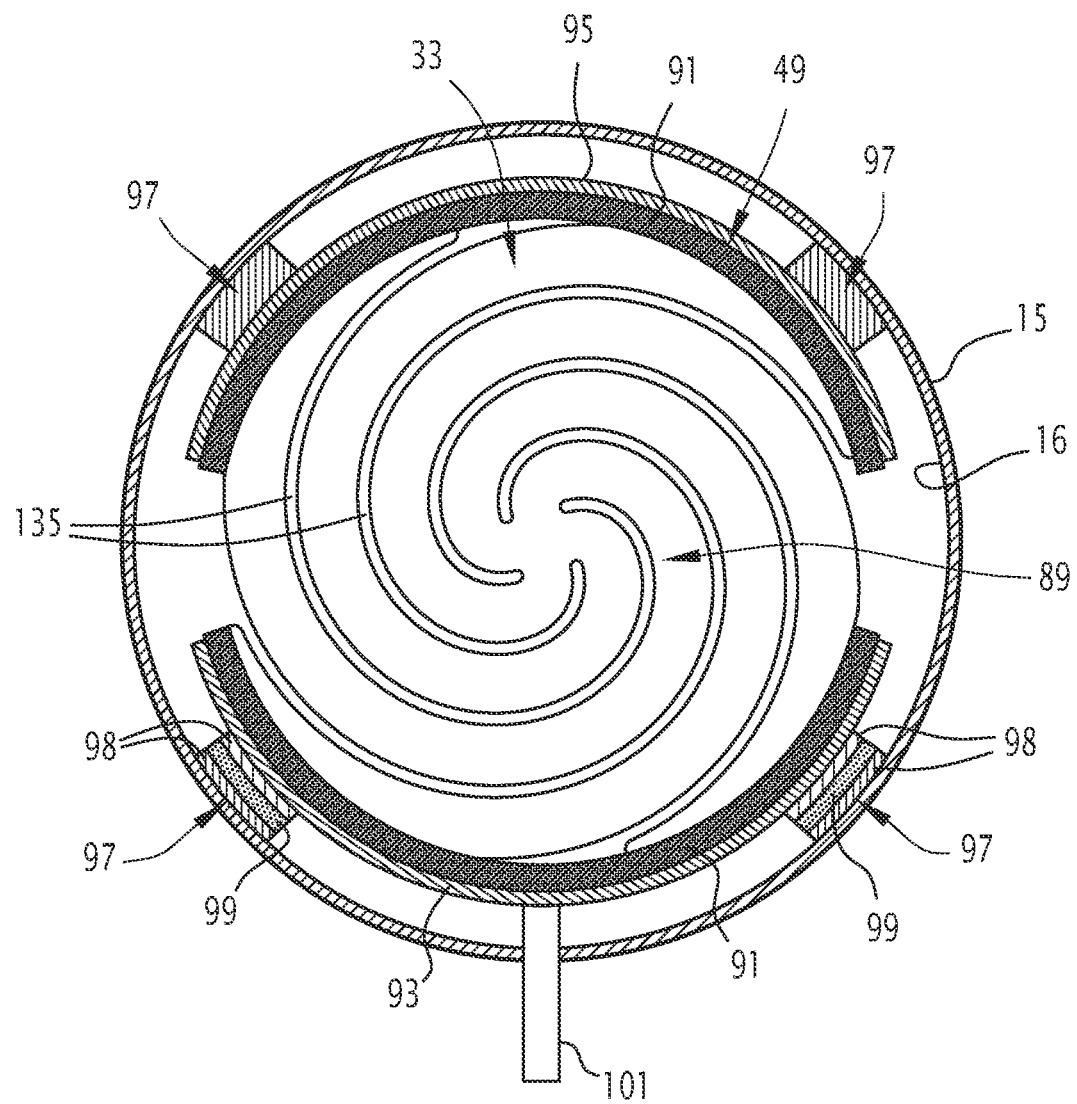
FIG. 5 is a cross-section view of a second embodiment of the purification device of the disclosure.

The reinforced edge area 91 advantageously forms an equipotential connection between the legs of the heating element 33, when the latter is of the spiral type having several legs, as shown in FIG. 5.

The attachment 35 secures the or each reinforced edge area 91 to the inner surface 16 of the tubular shell 15.

Thus, forces are transmitted through the attachment 35 from the or each reinforced edge area 91, which is more rigid than the central part 89 of the heating element 33.

The heating element 33 has, for example, two reinforced edge areas 91 (FIG. 5). Each reinforced edge area 91 is continuous and extends over a 25% to 50% fraction of the plate's periphery. The two reinforced edge areas 91 are symmetrical to each other with respect to the geometric centre of the heating element 33.

The attachment 35 in this case comprises at least one support plate 93, 95 extending along the rim 49 of the heating element 33 and rigidly attached to the or a reinforced edge area 91 of the heating element 33.

The attachment 35 further comprises a plurality of studs 97 rigidly securing the or each support plate 93, 95 to the inner surface 16 of the tubular shell 15.

In the example shown in FIG. 5, the attachment 35 comprises two support plates 93, 95 extending along the rim 49 of the heating element 33 and each rigidly attached to one of the reinforced edge areas 91.

The support plate 93 is made of an electrically conductive material. It is electrically connected to the first terminal 71 of the power supply 21.

Viewed in cross-section perpendicular to the central axis C, the support plate 93 is interposed between the heating element 33 and the tubular shell 15. It conforms to the shape of the outer edge of the heating element 33. Thus, when the heating element 33 is circular, the support plate 93 is circular in shape.

The studs 97 are electrically insulating. They have a sandwich structure and each comprise, for example, two metal layers 98 rigidly attached to the inner surface 16 of the tubular shell 15 and to the support plate 33 respectively, separated from each other by an electrically insulating layer 99.

A connector 101 passes through the tubular shell 15 via an opening in the tubular shell 15. A ring, not shown, electrically isolates the connector 101 from the tubular shell 15. The connector 101 provides the electrical connection from the support plate 93 to the first terminal 71 of the power supply 21.

The support plate 95 is also made of an electrically conductive material.

It is electrically connected to the tubular shell 15, which is the earth for the power supply 21.

Viewed in cross-section perpendicular to the central axis C, the support plate 95 is interposed between the heating element 33 and the tubular shell 15. It conforms to the shape of the outer edge of the heating element 33. Thus, when the heating element 33 is circular, the support plate 93 is circular in shape.

The attachment studs 95 of the support plate 95 are electrically conductive. They are rigidly attached on one side to the inner surface 16 of the tubular shell 15 and on the other to the support plate 95.

Each support plate 93, 95 extends substantially along the entire corresponding reinforced edge area 91. It is attached by its entire surface to the reinforced edge area 91.

Figure 6:
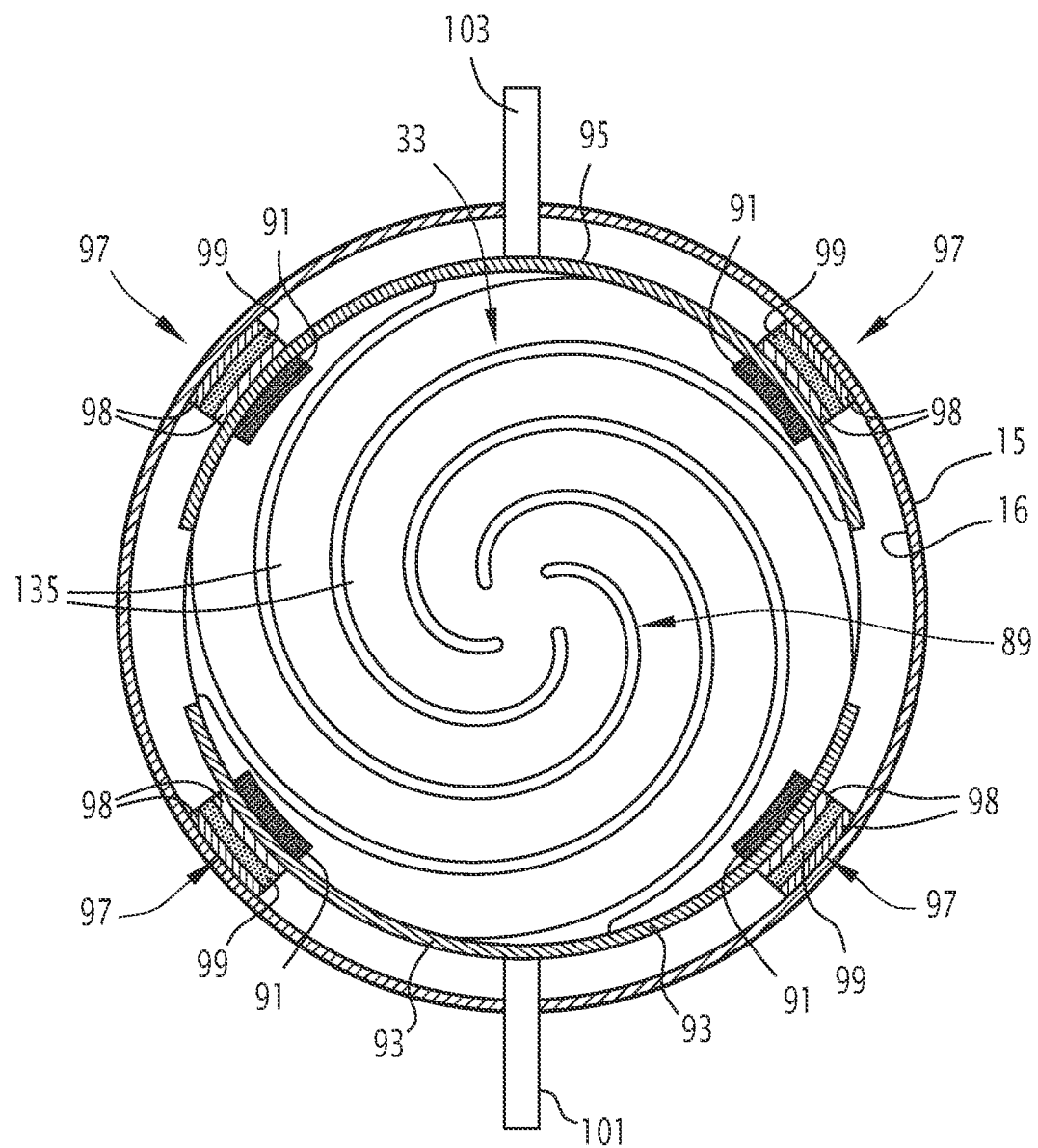
FIG. 6 is a similar view to FIG. 5, illustrating variants of the second embodiment.

In a variant embodiment shown in FIG. 6, a connector 103 passes through the tubular shell 15 via an opening in that tubular shell 15. A ring not shown electrically isolates the connector 103 from the tubular shell 15. The connector 103 provides the electrical connection from the support plate 95 to the second terminal 73 of the power supply 21. The support plate 95 is not electrically connected to the tubular shell 15.

The studs 97 securing the support plate 95 to the inner surface 16 of the tubular shell 15 are electrically insulating. They have the sandwich structure described above.

According to another variant embodiment shown in FIG. 6, the heating element 33 comprises a plurality of reinforced edge areas 91, each extending over a small fraction of the plate's periphery, for example between 2% and 15%. The heating element 33 has, for example, at least four reinforced edge areas 91. The reinforced edge areas 91 are spaced apart from each other and are, for example, evenly distributed around the heating element 33.

In this case, each support plate 93, 95 is rigidly attached to at least two reinforced edge areas 91, as shown in FIG. 6.

In yet another variant, not shown, the heating element 33 has a single reinforced edge area extending around substantially 100% of the periphery of the heating element.

In yet another variant embodiment, the support plates 93, 95 are used to attach a heating element which is not foam, but is of any other type: grid, honeycomb, etc.

Figure 7:
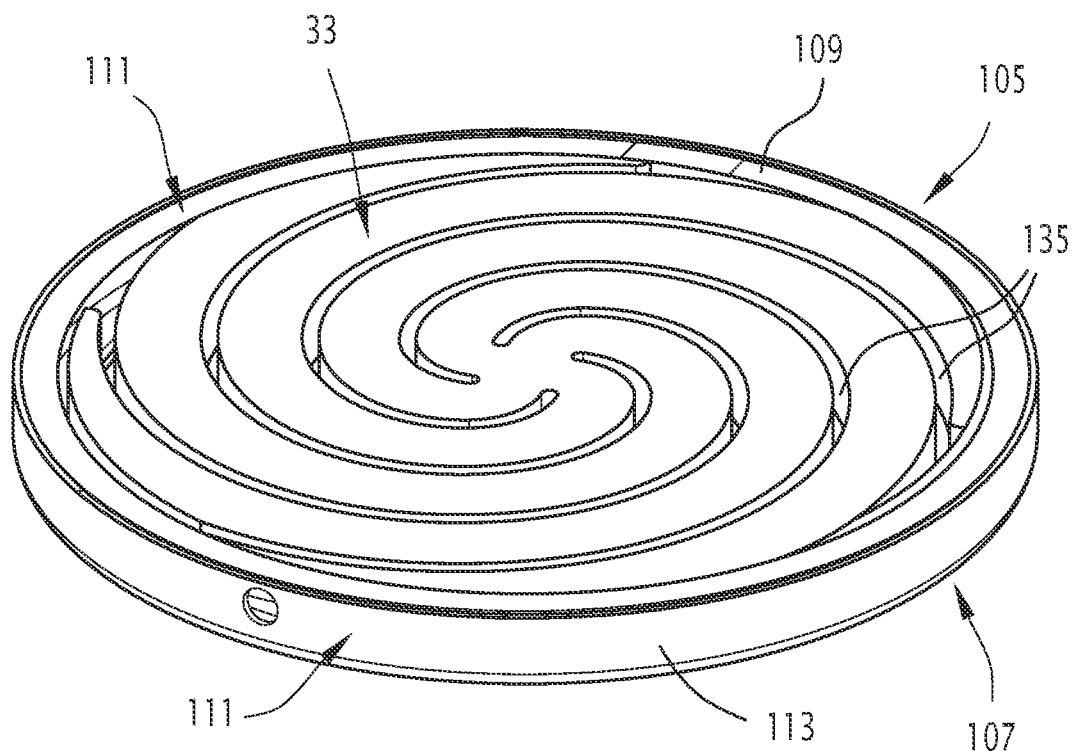
FIG. 7 is a perspective view, illustrating a variant of the first embodiment.

A variant of the first embodiment of the disclosure will now be described, with reference to FIGS. 7 and 8. Only the points in which this variant differs from the one in FIGS. 2 to 4 will be detailed below. Elements that are identical or perform the same functions in both variants will be referred to by the same references.

The attachment 35 comprises a peripheral frame 105 surrounding the heating element 33 and attached to the inner surface 16 of the tubular shell 15. The layer of electrically insulating material 37 is directly interposed between the frame 105 and the heating element 33.

The frame 105 completely surrounds the heating element 33. It is radially interposed between the heating element 33 and the tubular shell 15. Its shape corresponds to the shape of the outer edge of the heating element 33.

Viewed in cross-section in a plane containing the central axis C, the frame 105 is U-shaped and open towards the heating element 33. It thus defines a circular groove, in which the layer of electrically insulating material 37 is received.

The frame 105 thus has a cylindrical bottom 107 applied against the inner surface 16 of the tubular shell 15, and two annular wings 109 integral with the bottom 107. The wings 109 extend in respective planes perpendicular to the central axis C. They extend on either side of the large faces 43, 45 of the heating element 33, opposite the outer edge of the heating element.

The cylindrical portion 39 of the electrically insulating layer 37 bears against the bottom 107.

The annular portions 41 of the electrically insulating layer 37 each bear against one of the wings 109.

For ease of assembly, the peripheral frame 105 is advantageously divided into two half-frames 111 arranged axially on either side of the heating element 33.

Each half-frame 111 comprises a peripheral edge 113 interposed between the rim 49 of the heating element 33 and the inner surface 16 of the tubular shell 15.

The two peripheral edges 113 are axially interlocked. They are rigidly attached to each other by any suitable connection: peripheral welding, lugs, etc.

The two peripheral edges 113 together define the bottom 107 of the frame.

Each half-frame 111 comprises, in addition to the peripheral edge 113, one of the two wings 109.

The two half-frames 111 are independent parts, which are not integral with one another and which are attached to each other.

Figure 8:
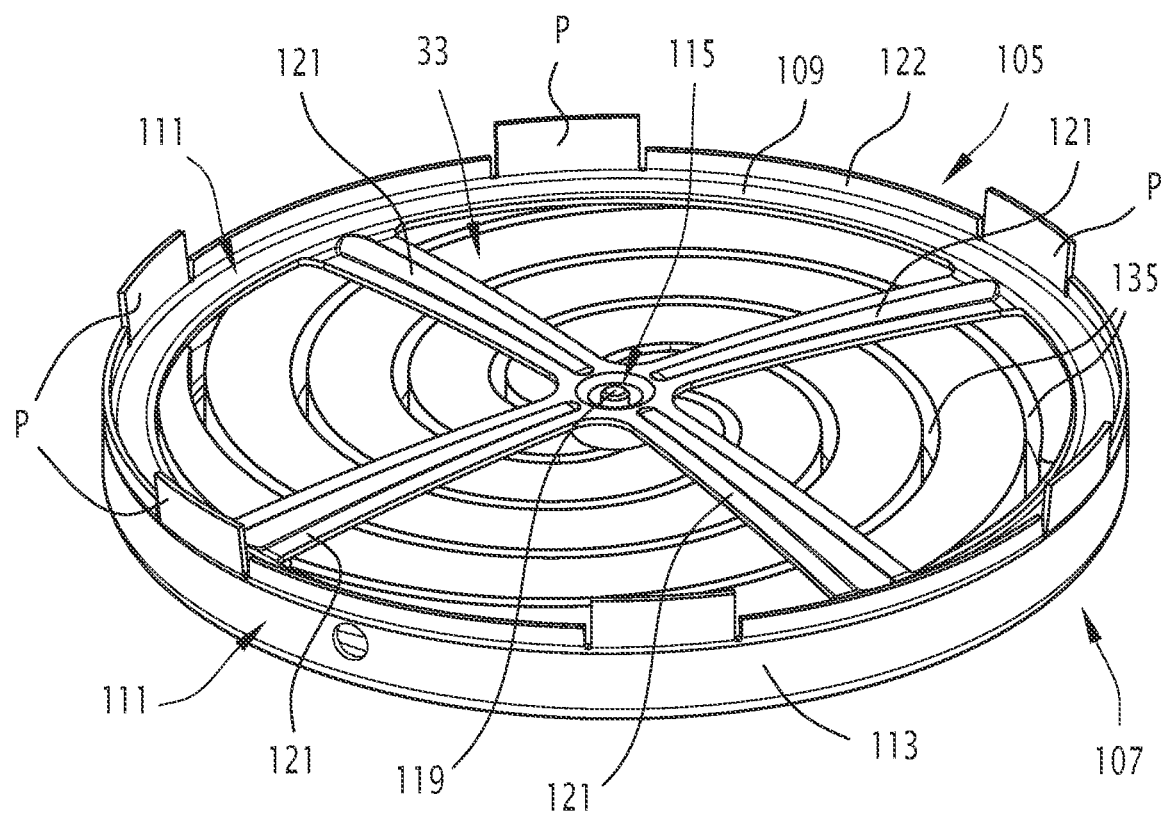
FIG. 8 is a perspective view, illustrating the variant embodiment of FIG. 7, and further showing a refinement of this variant.

Advantageously, the attachment 35 comprises at least one fastening member 115 rigidly attached to the heating element 33 at a distance from an outer edge 117 of the heating element 33 (FIG. 8).

Only one attachment member 115 has been shown in FIG. 8. Alternatively, the attachment 35 comprises a plurality of attachment members 115, distributed over the entire surface of the heating element 33.

The or each attachment member 115 has ends 119 protruding axially on either side of the heating element 33.

The peripheral frame 105 comprises arms 121 rigidly attached to the ends 119 of the or each attachment member 115.

This stiffens the heating element 33.

The arms 121 typically extend from the wings 109, and are integral with the wings 109.

In the example shown, the attachment 35 comprises a single attachment member 115, attached to the geometric centre of the heating element 33. The peripheral frame has four arms 121 opposite each large face 43, 45, forming 900 angles between them.

One of the half-frames 111 is as described above. The other half-frame 111 has an upstanding peripheral edge 122, extending axially from the wing 109 away from the heating element 33.

The attachment members 115 are of any suitable type. These are, for example, elongated attachment members, such as screws or tie rods.

According to one variant of the first embodiment, the layer 37 of electrically insulating material comprises two sub-layers stacked on one another.

The first underlayer, in contact with the heating element 33, is for example a ceramic layer overmolded on the heating element 33.

The second underlayer is interposed between the first underlayer and the frame 105 or between the first underlayer and the inner surface 16 of the tubular shell 15.

The second underlayer is for example a preformed fibre web, of the type of fibre web 27 holding the purification member 17 in position in the tubular shell 15. Such a web is known as "canning".

Alternatively, the second underlayer is made of a braided electrical insulation material.

In another embodiment, the second underlayer is a fibre rope or sleeve.

In another embodiment, the second underlayer is made of mica and is preformed.

Advantageously, a layer of electrical insulation is arranged in the through slots 135 of the heating element, so as to guide the electrical current.

Such a design allows for electrical insulation and highly effective attachment. It increases the force applied to the heating element, thus absorbing vibrations and expansion of the heating element. It increases the compactness of the heating system.

In a further embodiment of the first embodiment, the tubular shell 15 has weld holes in the peripheral frame 105 and welds joining the peripheral frame 105 to the tubular shell through the weld holes.

The peripheral frame 105 advantageously has tabs P provided for this purpose, visible in FIG. 8. The tabs P are pressed against the inner surface 16 in front of the welding holes. They project axially from the upstanding peripheral edge 122.

These holes allow the peripheral frame 105 to be welded to the tubular shell from the outside of the shell. Thus, there is no molten metal splash inside the tubular shell. In addition, the heat exchange surface between the heating element and the gas is increased.

The disclosure also relates to a method of attaching the peripheral frame 105 to the tubular shell 15 by welding through welding holes in the tubular shell 15 at the peripheral frame 105.

In another embodiment of the first embodiment, the peripheral frame 105 is a part of the tubular shell 15.

In this case, the layer 37 of electrically insulating material is preformed, and pre-installed in the peripheral frame 105.

The peripheral frame 105 in this case is typically a ring, radially U-shaped in cross-section. The layer 37 is pre-installed at the bottom of the U.

The bottom of the U defines part of the outer surface of the tubular shell. The legs of the U project inwards from the tubular shell 15.

According to this variant, the tubular shell 15 advantageously comprises several independent tubular sections, the peripheral frame 105 being interposed between two sections. The tubular sections are fitted and fastened axially on either side of the peripheral frame 105. For example, one of the sections corresponds to the inlet cone of the tubular shell 15, and the other corresponds to the cylindrical ferrule in which the purification member 17 is housed.

The peripheral frame 105, for ease of assembly around the heating element 33, is advantageously divided into a number of angular sectors, for example two semicircles, which are attached to each other.

Advantageously, the peripheral frame 105 has at least one attachment hole for an electrical supply electrode, electrically connected to the heating element 33.

This variant has the advantage of being very compact in thickness and diameter. The weight of the purification device is reduced. It facilitates the installation of the heating element and the integration of the purification device into the exhaust line.

Figure 9:
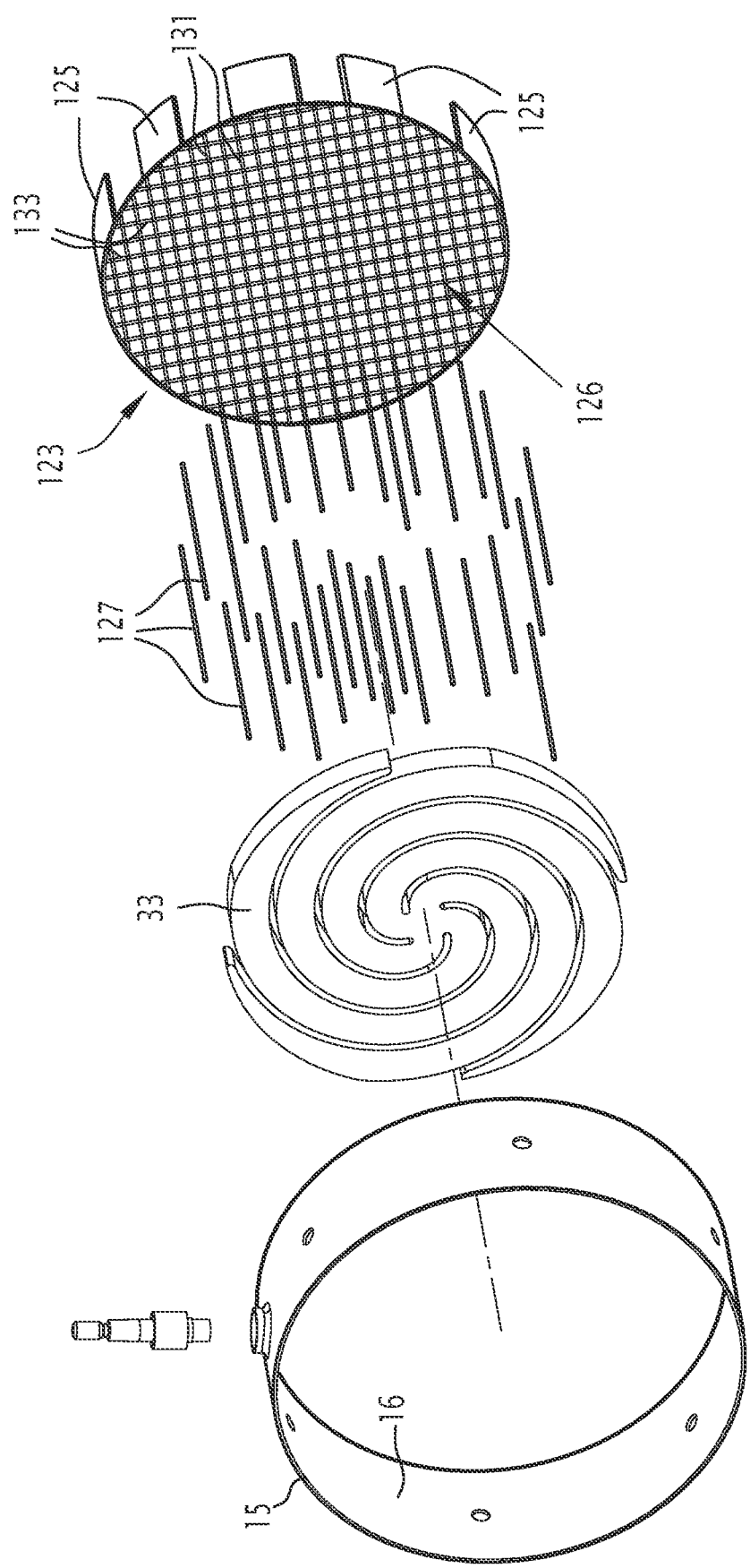
FIG. 9 is an exploded perspective view of a third embodiment of the purification device of the disclosure.

A third embodiment of the disclosure will now be described, with reference to FIGS. 9 and 10. Only the points in which this third embodiment differs from the first will be detailed below. Elements that are identical or perform the same functions in both embodiments will be referred to by the same references.

The attachment 35 comprises a support grid 123 extending in a plane substantially perpendicular to the central axis C and attachment members 125 for attaching the grid 123 to the inner surface 16 of the tubular shell 15.

The grid 123 has a large grid face 126 to which the heating element 33 is rigidly attached.

The support grid 123 extends substantially across the entire cross-section of the tubular shell 15. It has a high exhaust gas permeability. It is made of metal or ceramic.

The heating element 33 is not pressed against the support grid 123. A gap remains between the heating element and the support grid 123.

The attachment members 125 are, for example, tabs integral with the support grid and bent against the inner surface 16 of the tubular shell 15. They are typically welded to the inner surface 16 of the tubular shell 15.

The heating element 33 is rigidly attached to the support grid 123 for example by rods 127. Each rod 127 at one end is rigidly attached to the heating element 33. At its opposite end, each rod 127 is engaged in an attachment hole 129, corresponding to a mesh of the grid (FIG. 10).

If the support grid 123 is electrically insulating, the rods 127 may be made of an electrically insulating or conductive material, but if the grid is electrically conductive, the rods must be electrically insulating The insulator is typically a ceramic (glass, magnesium oxide, alumina).

The support grid 123 comprises for example a plurality of transverse bars 131, and a plurality of longitudinal bars 133 perpendicular to the transverse bars 131.

The transverse bars 131 are arranged in pairs, with the two transverse bars 131 in a pair having a small longitudinal distance between them. The pairs of transverse bars 131 have a relatively larger longitudinal spacing between them.

Similarly, the longitudinal bars 133 are arranged in pairs, with the two longitudinal bars 133 in a pair having a small transverse spacing between them. The pairs of longitudinal bars 133 have a relatively larger transverse spacing between them.

Figure 10:
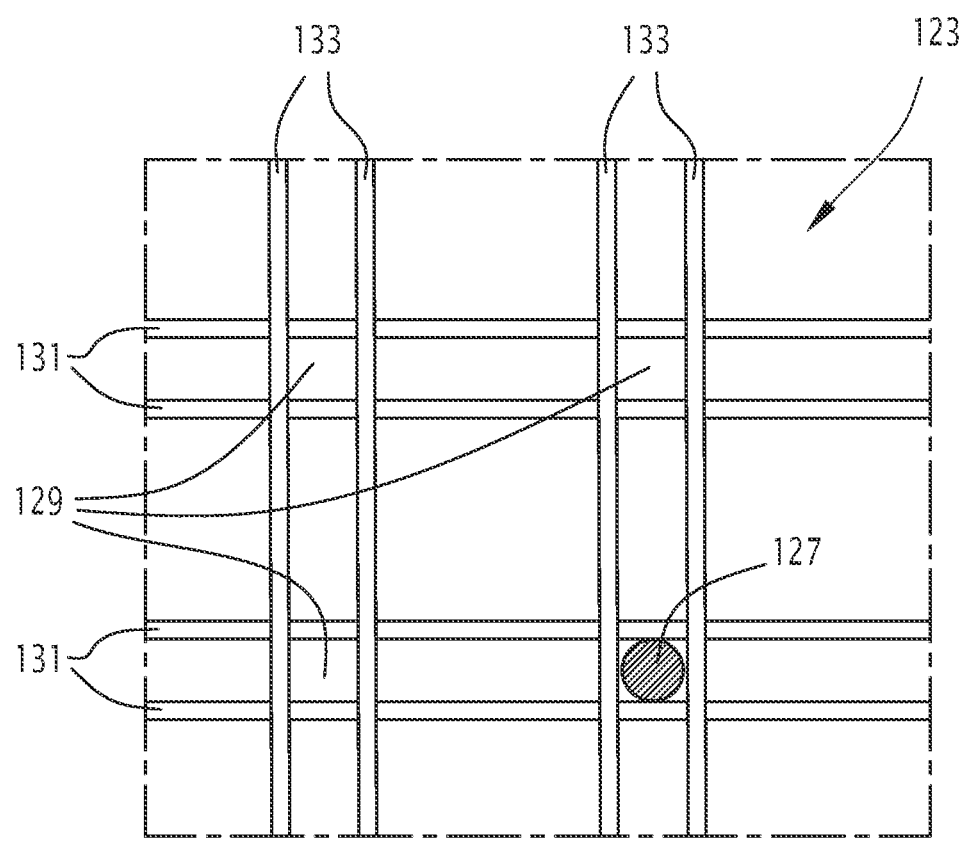
FIG. 10 is an enlarged, schematic view of a detail from FIG. 9, showing the attachment of the heating element to the support grid.

The attachment holes 129 are defined by the crossings between the pairs of transverse bars 131 and the pairs of longitudinal bars 133, as shown in FIG. 10.

The rods 127 are distributed over the entire surface of the heating element 33.

The rods 127 embedded in the support grid 123 have for example a shape with a groove arranged to be wedged between the bars 131, 133. Alternatively, the rods 127 are welded.

One advantage of the low-mass bar attachment, apart from the low back-pressure, is the flexibility to accommodate thermal expansion of the heating element. The bars, their shapes, and the spacing between the bars are chosen to allow the expansion of the support and the heating element without adding stress.

Figure 11:
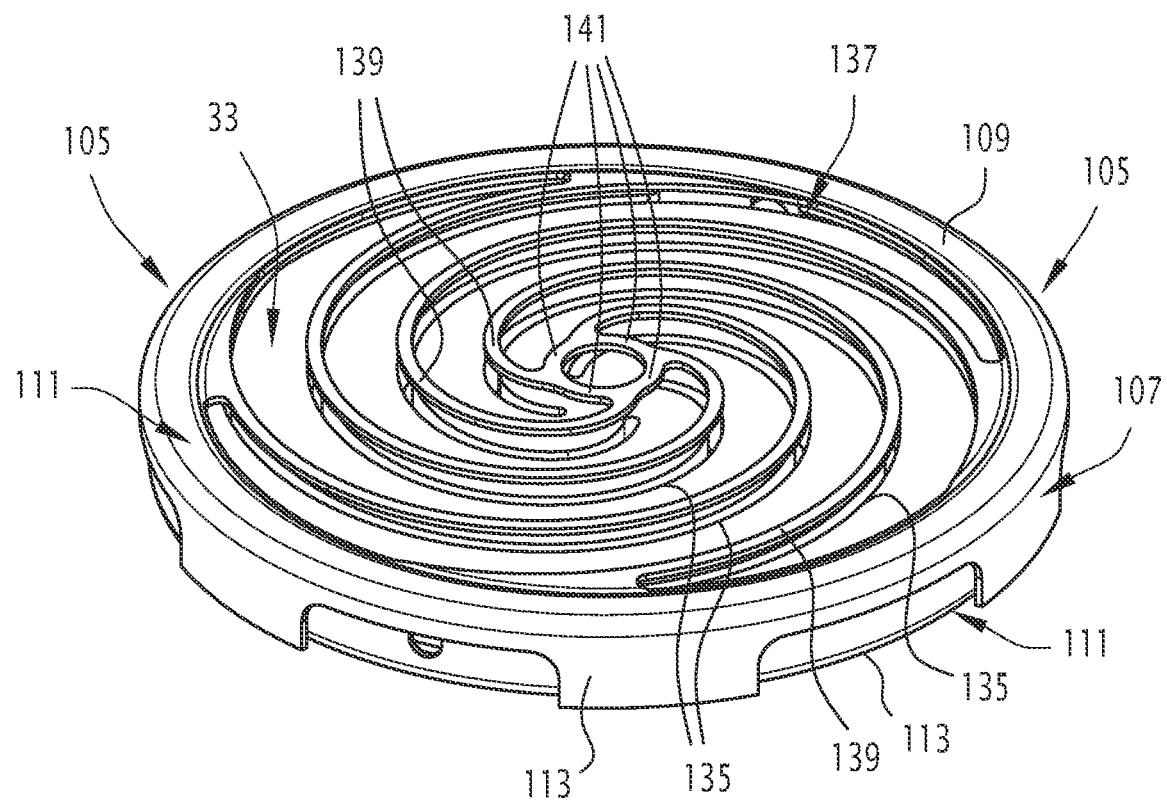
FIG. 11 is a perspective view, illustrating the variant embodiment of FIG. 7, and further showing a second refinement of this variant.

According to a variant applicable to all embodiments of the disclosure, the heating element 33 has a plurality of through-slots 135 (visible, for example, in FIGS. 5, 6, 7), the purification device 1 comprising a mask 137 arranged opposite one of the large faces 43, 45 of the heating element 33 and comprising solid areas 139 axially opposite the slots 135 (FIG. 11).

A through-slot 135 is understood here to mean a slot passing through the heating element 33 over its entire axial thickness, from the large face 43 to the large face 45.

Each through-slot 135 is open on the large side 43 and on the large side 45. It therefore provides a preferred escape route for the exhaust gas through the heating element 33. It is advantageous to limit the leakage rate through the through-slots 135 in order to improve heating quality. This is done with the help of mask 137.

The mask 137 has a solid area 139 opposite each through-slot 135. The solid area 139 has substantially the same shape as the corresponding through-slot 125. It therefore has an elongated shape, substantially the same length and substantially the same width as the corresponding through-slot 125. It has the same design as the through-slot 125.

The mask 137, between the solid areas 139, is hollowed out, so as not to create excessive back-pressure. Advantageously, spacers 141 connect the solid areas 139 to each other, to stiffen the mask.

In total, at least 80% of the surface of the mask 137 is preferably hollow.

In the example shown in FIG. 11, the mask 137 is integral with the peripheral frame 105. Alternatively, the mask 137 is a member mechanically independent of the heating element 33 and/or the attachment 35. The mask 137 is, for example, a plate rigidly attached to the tubular shell 15.

The mask 137 is placed upstream or downstream of the heating element 33.

Figure 12:
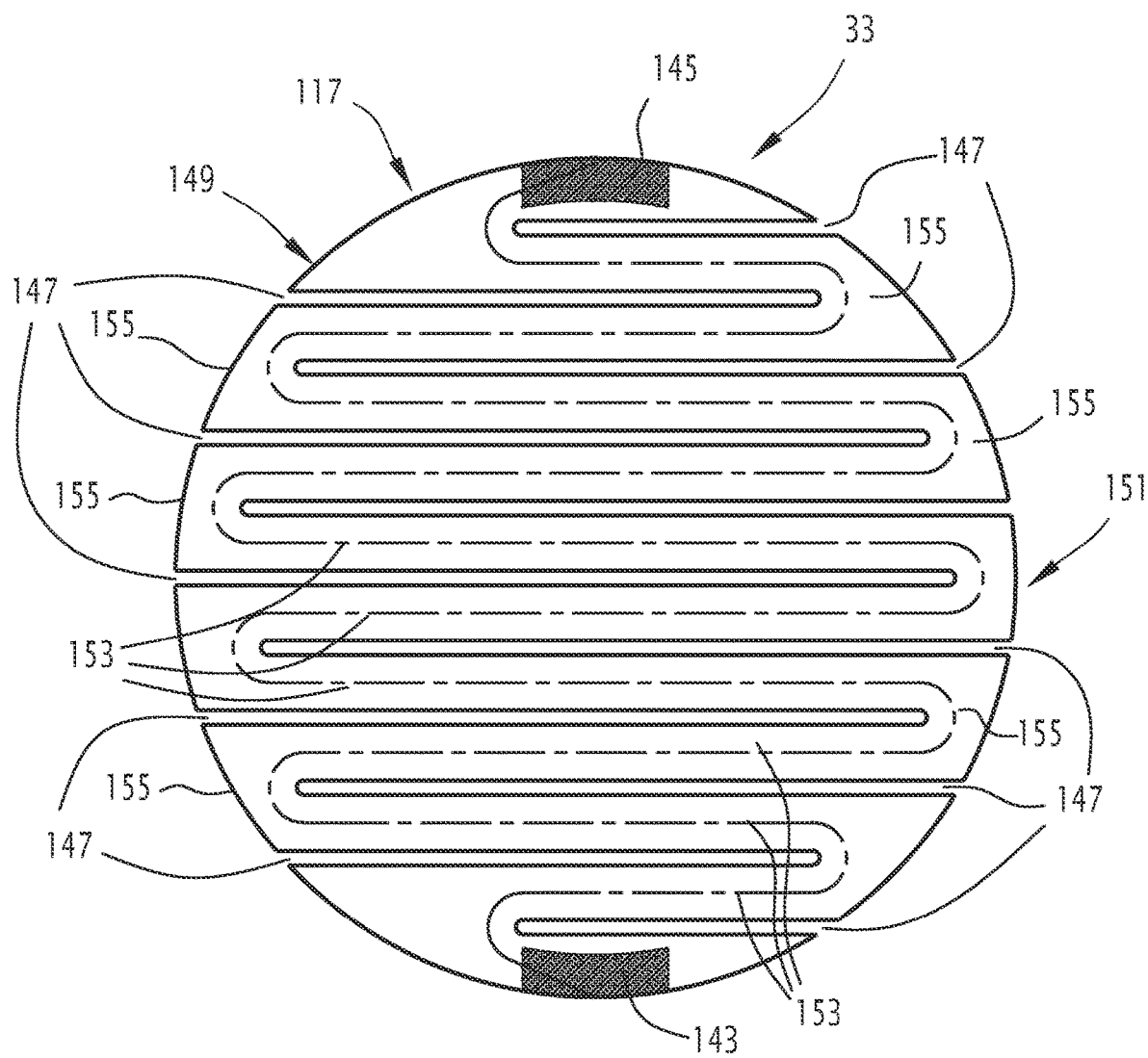
FIG. 12 is a top view of a particularly advantageous embodiment of the heating element, which can be used in all embodiments of the disclosure.

In an embodiment applicable to all embodiments of the disclosure, the heating element 33 has first and second areas 143, 145 electrically connected to first and second terminals 71, 73 of the power supply 21, the heating element 33 having through-slots 147 defining a single S-shaped path through the heating element 33 for electrical current between the first and second areas 143, 145 (FIG. 12).

The first and second areas 143, 145 are located on the outer edge 117 of the heating element 33, and are symmetrical to each other about a geometric centre of the heating element 33.

The geometric centre is the barycentre of all points on the plate. When the heating element is circular, it is the centre of the circle.

The first and second areas 143, 145 divide the outer edge 117 into two opposing parts 149 and 151.

A through-slot 147 is understood here to mean a slot passing through the heating element 33 over its entire axial thickness, from the large face 43 to the large face 45.

Each through-slot 147 is open on the large side 43 and on the large side 45.

The slots 147 are all parallel to each other. They all run in a transverse direction.

The slots 147 follow each other longitudinally, i.e. they are all longitudinally offset from each other.

Each slot 147 extends transversely from either part 149 or part 151 of the outer edge 117. It is open at the said part. It extends over more than 50% of the transverse width of the heating element taken at said slot, preferably over 75% of the width.

The slots 147 extend alternately from part 149 and from part 151 of the outer edge 117. In other words, two longitudinally successive slots 147 will extend one from part 149 and the other from part 151 of the outer edge 117.

Typically, the first and second areas 143, 145 are substantially aligned longitudinally. Alternatively, the line through the first and second areas 143, 145 makes a small angle with the longitudinal direction, typically less than 45°.

The electric current thus follows a path comprising a plurality of transverse branches 153, connected to each other by U-shaped areas 155 alternately oriented in opposite directions.

The number of slots 147 depends on the size of the heating member 33. It is typically between 4 and 20.

Each slot has a small width, for example between 1 and 3.

The first and second areas 143, 145 are typically reinforced edge areas of the type described above.

A heating element offering the electric current such an S-path has the advantage that its resonance frequencies are relatively high, and are significantly higher than the excitation frequencies generated by the vehicle's combustion engine. The heating element is therefore not very sensitive to vibrations generated by the engine, and its robustness and durability are correspondingly improved.

The disclosure has been described above for a circular heating element. The heating element can have any other suitable shape: Oval, racetrack, elliptical, rectangular, TV screen (i.e. rectangle with rounded corners and/or edges), etc.

The disclosure has been described above for a heating member mounted in the same tubular shell as an exhaust gas purification member. Alternatively, the heating member and the exhaust gas purification member are mounted in different tubular shells, fluidly connected by a conduit.

According to an advantageous variant, applicable to all embodiments, the heating element 33 has at least one through-slot inclined at 5 to 30° with respect to the axis C. Typically, the heating element 33 has several through slots inclined by 5 to 30° relative to the axis C. These slots are open on the large face 43 and on the large face 45.

Each slot is elongated, along a straight or sinuous centre line. The straight sections of the slot, taken perpendicular to the centre line, are bounded by two opposite edges, substantially parallel to each other. These two edges each form an angle of between 5 and 30° with the axis C.

This has the advantage of diverting the exhaust gas flowing through the heating member and increasing the contact area between the gas and the heating member. This improves the heat transfer between the gas and the heating element.

In all embodiments of the disclosure and in all variant embodiments envisaged, a layer of electrical insulation is advantageously arranged in any through-slots in the heating element so as to guide the electrical current.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas purification device for a vehicle, the exhaust gas purification device comprising:
a tubular shell having an inner surface and having a central axis;
an electric heating member housed in the tubular shell, the electric heating member comprises a heating element made of an electrically conductive material which is permeable to exhaust gases, wherein the heating element is made of a foam, and the heating element having a central portion in which the foam has a first density and at least one reinforced edge area in which the foam has a second density greater than the first density;
a power supply configured to supply power to the electric heating member; and
an attachment configured to directly attach the heating element to the inner surface, and the attachment securing the, or each of, the at least one reinforced edge area to the inner surface.

2. The exhaust gas purification device according to claim 1, wherein the attachment comprises at least one support plate extending along a rim of the heating element and rigidly attached to a reinforced edge area of the heating element.

3. The exhaust gas purification device according to claim 2, wherein the attachment comprises a plurality of studs rigidly securing the, or each of, the at least one support plate to the inner surface.

4. The exhaust gas purification device according to claim 1, wherein the attachment comprises a layer of electrically insulating material interposed between the heating element and the inner surface.

5. The exhaust gas purification device according to claim 4, wherein the layer of electrically insulating material comprises at least one annular portion interposed axially between a major face of the heating element and the inner surface.

6. The exhaust gas purification device according to claim 4, wherein the attachment comprises a peripheral frame surrounding the heating element and attached to the tubular shell, the layer of electrically insulating material being directly interposed between the peripheral frame and the heating element.

7. The exhaust gas purification device according to claim 6, wherein the peripheral frame is divided into two half-frames arranged axially on either side of the heating element, each half-frame comprising a peripheral edge interposed between a rim of the heating element and the inner surface, the peripheral edges being axially interlocked with each other.

8. The exhaust gas purification device according to claim 6, wherein the attachment comprises at least one attachment member rigidly attached to the heating element at a distance from an outer edge of the heating element, the, or each of, the at least one attachment member having axially protruding ends on either side of the heating element, the peripheral frame comprising arms rigidly attached to the axially protruding ends of the, or each of, the at least one attachment member.

9. The exhaust gas purification device according to claim 6, wherein the peripheral frame is a part of the tubular shell.

10. The exhaust gas purification device according to claim 4, wherein the layer of electrically insulating material comprises two sub-layers stacked on one another.

11. The exhaust gas purification device according to claim 1, wherein the attachment comprises a support grid extending in a plane substantially perpendicular to the central axis and attachment members attaching the support grid to the inner surface, the support grid having a large grid face to which the heating element is rigidly attached with electrically insulated rods.

12. The exhaust gas purification device according to claim 1, wherein the heating element has a plurality of through-slots, the exhaust gas purification device comprising at least one mask arranged opposite a large face of the heating element and comprising solid areas axially opposite the plurality of through-slots.

13. The exhaust gas purification device according to claim 1, wherein the heating element has first and second areas electrically connected to first and second terminals of the power supply, the heating element having through-slots defining a single S-shaped path through the heating element for electrical current between the first and second areas.

14. The exhaust gas purification device according to claim 13, wherein the first and second areas are located on an outer edge of the heating element, and are symmetrical to each other with respect to a geometric center of the heating element.

15. The exhaust gas purification device according to claim 13, wherein the through-slots are all parallel to each other.

16. The exhaust gas purification device according to claim 1, wherein the heating element has at least one through-slot inclined at 5 to 30° relative to the central axis.

17. An exhaust gas purification device for a vehicle, the exhaust gas purification device comprising:
- a tubular shell having an inner surface and having a central axis;
- an electric heating member housed in the tubular shell, the electric heating member comprises a heating element made of an electrically conductive material which is permeable to exhaust gases;
- a power supply configured to supply power to the electric heating member;
- an attachment configured to directly attach the heating element to the inner surface, wherein the attachment comprises a layer of electrically insulating material interposed between the heating element and the inner surface;
- wherein the attachment comprises a peripheral frame surrounding the heating element and attached to the tubular shell, the layer of electrically insulating material being directly interposed between the peripheral frame and the heating element; and
- wherein the tubular shell has welding holes at the peripheral frame and welds joining the peripheral frame to the tubular shell through the welding holes.

18. A method of manufacturing an exhaust gas purification device for a vehicle, the exhaust gas purification device comprising:
- a tubular shell having an inner surface and having a central axis;
- an electric heating member housed in the tubular shell, the electric heating member comprises a heating element made of an electrically conductive material which is permeable to exhaust gases;
- a power supply configured to supply power to the electric heating member;
- an attachment configured to directly attach the heating element to the inner surface, wherein the attachment comprises a layer of electrically insulating material interposed between the heating element and the inner surface;
- wherein the attachment comprises a peripheral frame surrounding the heating element and attached to the tubular shell, the layer of electrically insulating material being directly interposed between the peripheral frame and the heating element;
- wherein the tubular shell has welding holes at the peripheral frame and welds joining the peripheral frame to the tubular shell through the welding holes; and
- the method comprising a step of attaching the peripheral frame to the tubular shell by welding through welding holes provided in the tubular shell on the peripheral frame.

* * * * *

UNITED STATES PATENT AND TRADEMARK OFFICE
CERTIFICATE OF CORRECTION

PATENT NO. : 11,840,950 B2
APPLICATION NO. : 17/610728
DATED : December 12, 2023
INVENTOR(S) : Ottaviani et al.

Page 1 of 1

It is certified that error appears in the above-identified patent and that said Letters Patent is hereby corrected as shown below:

On the Title Page

"(22) PCT Filed: May 5,2020"
Should read as follows:
--(22) PCT Filed: May 15, 2020--

Signed and Sealed this
Sixteenth Day of January, 2024

Katherine Kelly Vidal
Director of the United States Patent and Trademark Office